United States Patent
Palombo

(10) Patent No.: US 7,743,807 B2
(45) Date of Patent: Jun. 29, 2010

(54) TREAD RUBBER COMPOSITION FOR COLOR SMOKE TIRES, TIRE COMPRISING THE SAME, AND METHOD OF MANUFACTURING THE SAME

(75) Inventor: James L. Palombo, Canton, OH (US)

(73) Assignee: Kumho Tire Co., Inc., Seoul (KR)

( * ) Notice: Subject to any disclaimer, the term of this patent is extended or adjusted under 35 U.S.C. 154(b) by 1033 days.

(21) Appl. No.: 11/367,270

(22) Filed: Mar. 3, 2006

(65) Prior Publication Data

US 2006/0207700 A1  Sep. 21, 2006

Related U.S. Application Data

(60) Provisional application No. 60/659,453, filed on Mar. 8, 2005.

(51) Int. Cl.
  *B60C 1/00* (2006.01)
  *B60C 11/00* (2006.01)
  *C06D 3/00* (2006.01)

(52) U.S. Cl. .................... 152/209.1; 149/19.9; 149/117

(58) Field of Classification Search ............. 152/209.1, 152/209.4; 149/19.9, 117
See application file for complete search history.

(56) References Cited

U.S. PATENT DOCUMENTS

| | | | | |
|---|---|---|---|---|
| 3,690,971 | A | * | 9/1972 | Gunderloy et al. .......... 149/117 |
| 4,151,233 | A | * | 4/1979 | Fry, Jr. ...................... 149/19.9 |
| 4,366,010 | A | * | 12/1982 | Sedat ......................... 149/117 |
| 4,455,178 | A | * | 6/1984 | Sedat ......................... 149/117 |
| 4,604,604 | A | * | 8/1986 | Mann ......................... 340/454 |
| H227 | H | * | 3/1987 | Tracy et al. .................. 149/84 |
| 4,997,497 | A | * | 3/1991 | Wilson et al. ............... 149/117 |
| 6,279,633 | B1 | | 8/2001 | Corvasce |
| 6,298,889 | B1 | | 10/2001 | Smith |
| 6,431,236 | B1 | | 8/2002 | Kanenari et al. |
| 6,474,382 | B1 | | 11/2002 | Finck |
| 6,489,393 | B1 | | 12/2002 | Sitabkhan et al. |
| 6,552,660 | B1 | * | 4/2003 | Lisowski ................. 340/568.7 |
| 6,561,243 | B2 | | 5/2003 | Zanzig et al. |
| 6,561,244 | B2 | | 5/2003 | Zanzig et al. |
| 6,583,210 | B2 | | 6/2003 | Zanzig et al. |
| 6,709,138 | B1 | | 3/2004 | Johnson |

(Continued)

OTHER PUBLICATIONS

Palombo, Jim, "The evolution of colored smoke tires", Rubber World, Mar. 2007, eight pages.*

*Primary Examiner*—Steven D Maki
(74) *Attorney, Agent, or Firm*—Wegman, Hessler & Vanderburg

(57) ABSTRACT

A tread rubber composition for tires, including a sublimation dye that is activated by heat generated by frictional contact with a road surface to generate smoke having various colors at a wavelength of about $39\text{-}76\times10^{-6}$ cm (390 nm to 760 nm) in a frequency range of about $39.5\text{~}77\times10^{13}$ vps ($39.5\times10^{13}$ Hz to $77\times10^{13}$ Hz. In addition, a tire including the tread rubber composition and a method of manufacturing the tread rubber composition are also provided. According to the current invention, the tread rubber composition included in the tire can generate smoke having a single color or mixed colors selected from among various colors, therefore obtaining smoke that gives optimal enjoyment and satisfies requirements of drivers at motor sports events, such as drifting.

17 Claims, 4 Drawing Sheets
(3 of 4 Drawing Sheet(s) Filed in Color)

U.S. PATENT DOCUMENTS

| | | |
|---|---|---|
| 2001/0050124 A1 | 12/2001 | Smith |
| 2002/0066507 A1 | 6/2002 | Sievi-Korte et al. |
| 2002/0100528 A1 | 8/2002 | Sandstrom et al. |
| 2002/0143095 A1 | 10/2002 | Zanzig et al. |
| 2002/0144761 A1 | 10/2002 | Zanzig et al. |
| 2002/0147257 A1 | 10/2002 | Zanzig et al. |
| 2002/0174924 A1 | 11/2002 | Zanzig et al. |
| 2003/0140999 A1 | 7/2003 | Smith et al. |
| 2004/0020575 A1 | 2/2004 | Zanzig et al. |
| 2004/0050471 A1 | 3/2004 | Cottin et al. |
| 2004/0055680 A1 | 3/2004 | Cottin et al. |
| 2004/0072601 A1* | 4/2004 | Burton .................... 463/7 |
| 2004/0118496 A1 | 6/2004 | Vannan et al. |
| 2008/0271347 A1* | 11/2008 | Rosenberger ............ 36/136 |

* cited by examiner

TREAD RUBBER COMPOSITION FOR COLOR SMOKE TIRES, TIRE COMPRISING THE SAME, AND METHOD OF MANUFACTURING THE SAME

CROSS REFERENCE TO RELATED APPLICATION

The present application claims priority under 35 U.S.C. §119(e) to U.S. Provisional Patent Application No. 60/659,453, filed Mar. 8, 2005.

BACKGROUND OF THE INVENTION

1. Field of the Invention

The present invention pertains to tires for motor vehicles, and more particularly, to a tread rubber composition for tires useful in generating colored smoke when the tires are used in motor sporting events and the like to provide a visual effect, and to methods for making such tires.

2. Description of Related Art

"Drifting" is becoming a popular addition to the motor sport field. This sport originated in Japan and has become increasingly popular in America. In "drifting", the motor cars are controlled via skilled drivers as the cars slide sideways in a sliding or skidding pattern down the course.

Unlike other motor sports, the goal in "drifting" is not to maintain traction. Instead, the cars skid and slide in analogous fashion to racing on an icy or snow filled course. Drivers are not judged on speed but rather on style and form. Typically, "drifting" participants utilize rear wheel drive cars for the event, and the tires are made to screech and billow smoke as the drivers proceed down the course.

Although conventional smoke-generating techniques have been attempted at drifting events to exhibit visual effects, the color of smoke generated is simply white, which does not attract much interest. It would be desirable to develop tread rubber compositions for tires that would cause the tires to emit various colors of smoke in order to increase the enjoyment of drivers and spectators.

SUMMARY OF THE INVENTION

Accordingly, one aspect of the present invention is to provide a tread rubber composition for tires which can generate smoke, having a single color or mixed colors selected from among various colors, at a predetermined temperature or higher due to the frictional contact between the tire and the road surface, so as to confer enjoyment and satisfy requirements of drivers at motor sports events, such as drifting.

Another aspect of the present invention is to provide a tire comprising the tread rubber composition.

A further aspect of the present invention is to provide a method of manufacturing the tread rubber composition.

In one aspect, the invention provides a tread rubber composition for tires, which comprises a sublimation dye that is activated by heat, generated by the frictional contact with a road surface, to generate smoke having various colors at a wavelength of about 39~76×10$^{-6}$ cm (390 nm to 760 nm) in a frequency range of about 39.5~77×10$^{13}$ vps (39.5×10$^{13}$ Hz to 77×10$^{13}$ Hz) (vibrations per second).

According to the present invention, the tread rubber composition may be included in the tread of a tire mounted to trucks/LTRs (light truck radials), automobile cars, and motor sports cars.

In the tread rubber composition, the sublimation dye may be contained in an amount of 0.1-30 wt %, based on the total weight of the tread rubber composition.

In the tread rubber composition, the sublimation dye may be activated at 130° C. or higher to generate color smoke.

Further, the present invention provides a method of manufacturing the tread rubber composition, comprising mixing a material for a tread rubber composition with a sublimation dye, which is activated by heat generated by frictional contact with a road surface to generate smoke having various colors at a wavelength of about 39-76×10$^{-6}$ cm (390 nm to 760 nm) in a frequency range of about 39.5~77×10$^{13}$ vps (39.5×10$^{13}$ Hz to 77×10$^{13}$ Hz).

The method of the present invention may comprise the addition of the sublimation dye in an amount of 0.1-30 wt %, based on the total weight of the tread rubber composition.

The method may comprise the addition of the sublimation dye which is activated at 130° C. to generate color smoke.

Through the addition of a heat activated sublimable dye into a rubber compound either prior to vulcanization or during vulcanization of the rubber, the rubber compound will produce a dye colored smoke when reaching the activation temperature of the dye. Typically, smoke dyes have been used with pyrotechnics to produce colored smoke but up until this time an oxidizer would have been present with the dye and would be ignited to produce the required temperature to activate the dye. A similar family of dyes is used in laser printers wherein a dye is vaporized and deposited on paper. These dyes may, in accordance with the present invention, be utilized in tire tread compounds to produce the desired aesthetically pleasing decorative colored smoke when used in drifting or other motor sporting events.

Rubber tread compounds on tires can reach very high temperature when the tire spins or skids across the pavement at high speeds after losing traction. At present, this often produces a cloud of white smoke that emanates from the tire. By incorporating a heat activated dye into the tread rubber compound, a colored smoke can be created during the spin. This produces an added visual entertainment effect in motor sport events such as "drifting".

The invention will be further described in the following detailed description and drawing.

BRIEF DESCRIPTION OF THE DRAWINGS

The patent or application file contains at least one drawing executed in color. Copies of this patent or patent application publication with color drawings will be provided by the Office upon request and payment of the necessary fee.

The above mentioned and other features of this invention will become more apparent and the invention itself will be better understood by reference to the following description of embodiments of the invention taken in conjunction with the accompanying drawings, wherein.

DETAILED DESCRIPTION OF EXEMPLARY EMBODIMENTS

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Figure 1:
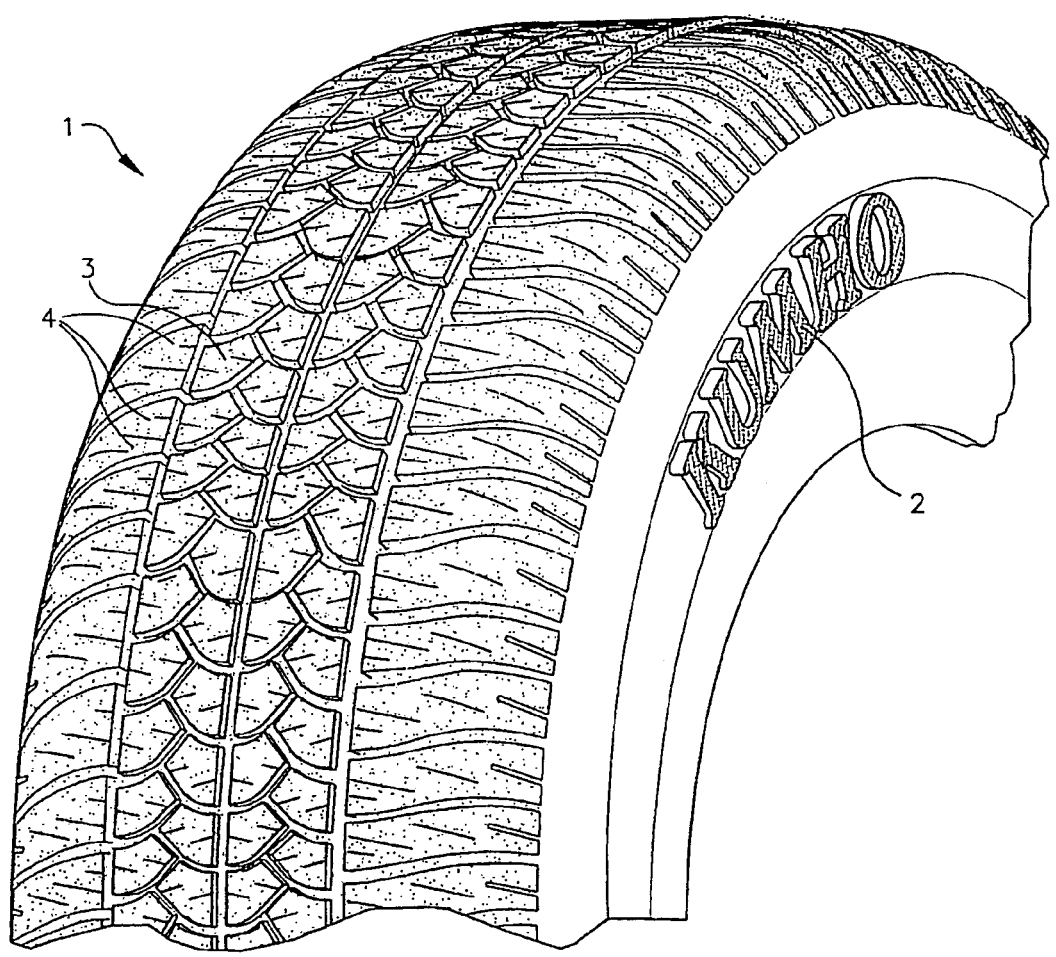
FIG. 1 is a fragmented perspective view of a tire in accordance with the invention.

Turning now to the drawings, FIG. 1 illustrates a tire 1 of the type having a tread portion 3 around the circumference of the tire and adapted to engage a substrate such as a road or pavement. The sidewall of the tire may have the manufacturer's trademark 2 imprinted thereon. As shown (and as greatly magnified to highlight the invention), a multiplicity of heat-activated smoke dye particles 4 are dispersed throughout the tread portion 3. Upon suitable frictional slipping or skidding engagement of the tire 1 with the substrate, a colored smoke is generated by the particles 4. Although discrete dye particles 4 are shown in FIG. 1, the artisan will appreciate that the dye may exist as part of a homogenous rubber composition disposed in the tread portion 3 of the tire 1.

The dye particles 4 are desirably a sublimation dye, which has generally been applied to flame preparation techniques along with an oxidizing agent, and generate color smoke when reaching an activation temperature. According to the present invention, such sublimation dyes having various colors may be used in the tread portion 3 of the tire 1 at drifting events or other motor sports events. When cars are driven with the wheels spinning and skidding at fast speeds on paved roads, the tread composition of the tire 1 containing the sublimation dye particles 4 reaches a very high temperature, and cloudy smoke is generated from the tire. As such, unlike conventional white smoke, in the present invention, smoke having various colors is generated thus providing greater visual enjoyment.

Useful in the present invention, the sublimation dye particles 4 included in the tire tread portion 3 is selected from among those that may be activated at a predetermined temperature or higher. That is, any dye may be used in the present invention, as long as it is activated at a predetermined temperature or higher, and preferably, at 130° C. or higher, in response to an increase in temperature due to the frictional contact between the road surface and the tire tread portion 3, to generate color smoke. When cars spin or skid, the color smoke is generated in the shape of a large cloud, emitting a spectrum desirably having a wavelength between about $39-76 \times 10^{-6}$ cm (390 nm to 760 nm) and a frequency between about $39.5 \sim 77 \times 10^{13}$ vps ($39.5 \times 10^{13}$ Hz to $77 \times 10^{13}$ Hz). Hence, the tread rubber composition comprising the sublimation color dye may exhibit smoke having various colors. For example, smoke having various colors, such as red, orange, yellow, blue, green, violet, etc., depending on the type of dye used, may be generated as desired, and a single color or two or more colors may be simultaneously generated.

A presently commercially available sublimation dye includes, for example, nitro, azo, triphenylmethane, xanthane, indigoid, quinoneimine, thiazole, anthraquinone, naphthalic acid derivatives, and diminonaphthalene quinoline derivatives. These dyes are disclosed in U.S. Pat. No. 3,690,971, the content thereof being incorporated herein by reference.

In Examples of the present invention as described below, the sublimation dye is exemplified by Smoke red, Smoke yellow, and/or Smoke blue, available from Keystone Aniline Corp. of Chicago, Ill., each of which belongs to a powdered anthraquinone dye having a bulk density of 350 kg/m3. Other dyes include, for example, OrcoSmoke Red 2A, OrcoSmoke Red 38, OrcoSmoke Violet XT, OrcoSmoke Violet FS, OrcoSmoke Green T, OrcoSmoke Yellow F, OrcoSmoke Yellow FT, OrcoSmoke Blue A, and OrcoSmoke Orange AO, available from Organic Dyestuffs Corp. of East Providence, R.I. Desirably, the sublimation dye 4 is added to the tread rubber composition in an amount of about 0.1-30 wt %, more desirably between about 0.1-20 wt %, and preferably, 5-10 wt %, but is not limited thereto.

The tread rubber for a tire is essentially composed of diene rubber, which includes natural rubber and synthetic rubber, for example, polyisoprene rubber (IR), polubutadiene rubber (BR), a conjugated diene aromatic vinyl copolymer (SBR), a nitrile conjugated diene copolymer (NBR), hydrogenated NBR, hydrogenated SBR, olefin rubber (EPDM), maleic acid-modified ethylene-propylene rubber, butyl rubber, a copolymer of isobutylene and aromatic vinyl or diene monomer, acryl rubber, an ionomer, halogenated rubber, or chloroprene rubber. The listed rubbers are disclosed in U.S. Pat. No. 6,431,236, the content thereof being incorporated herein by reference. Of these rubbers, SBR may contain oil.

In addition, other components for a tread rubber composition may be appropriately selected from among those well-known in conventional literatures and in the art. For instance, various additives, such as a vulcanizing agent, an accelerator, an activator, an antiozonant, a softening agent, or a reinforcing agent, may be added, if necessary. The reinforcing agent includes silica and carbon black, and may further include fatty acid, zinc oxide, or wax. The vulcanizing agent includes sulfur, and may further include hydrogen peroxide.

In the present invention, the 300% modulus of the tread rubber composition forming the tread rubber is classified into 85-140, 141-169, and 170 or more. In particular, the modulus of 85-140 is preferably employed. In addition, a tire is manufactured according to general processes, that is, mixing, extruding/calendaring, tire building, and curing. The rubber mixing process is conducted according to a typical mixing sequence. As such, the sublimation dye may be added to the initial stage of the mixing process, or to the final stage thereof, along with a vulcanizing agent. The extrusion process and the tire building process are conducted in the same manner as in typical processes, and the curing process is conducted at 140-180° C.

The colored-smoke producing tire 1 thus prepared is mounted to cars, and thus, the sublimation dye 4 included therein is activated by frictional contact with the road surface, generating color smoke having a single color or mixed colors.

A better understanding of the present invention may be obtained through the following examples, which are set forth to illustrate, but are not to be construed as the limit of the present invention.

EXAMPLES 1-3

Preparation of Sample Generating Red Smoke

Figure 2:
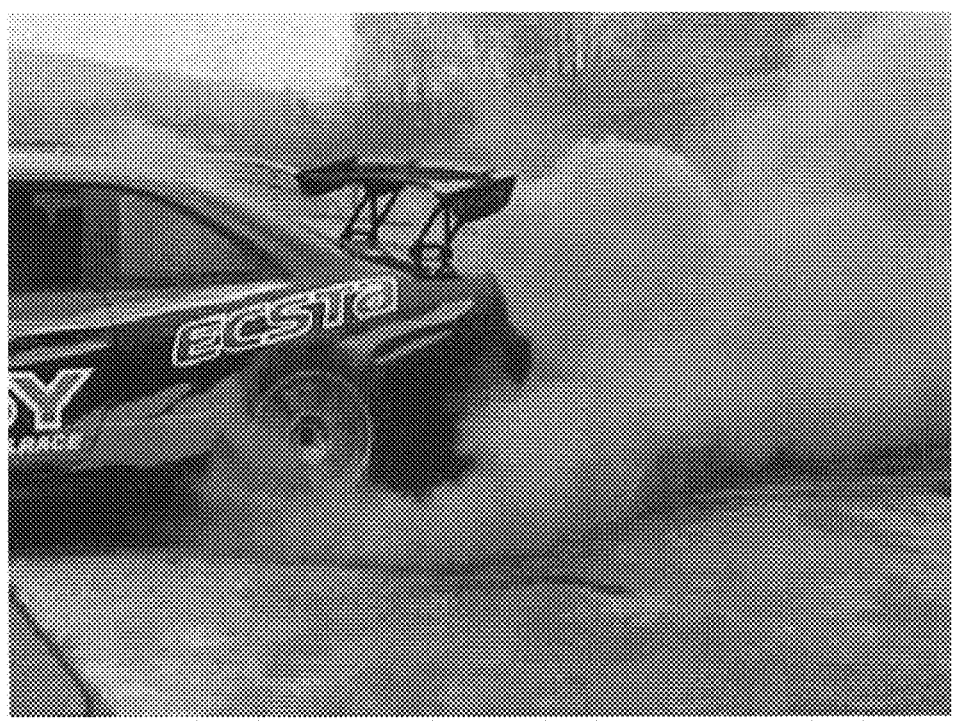
FIG. 2 is a color photograph showing red smoke generated from the tire of FIG. 1.

Master-batch components were mixed at 160° C. and finish components were mixed at 105° C., either of which included a smoke dye (Smoke red), as shown in Table 1 below. Thereafter, the finish mixed compound was extruded, to form various semi-finished products (tread, sidewall, bead, inner liner, belt, carcass, etc.), which were then subjected to a tire building process. Subsequently, the resultant green case for a tire finally underwent a curing process at 180° C. for 15 min, to manufacture a desired tire. When the tire was skidded on a paved road, cloudy red smoke was formed (FIG. 2).

TABLE 1

|  |  | Ex. 1 | Ex. 2 | Ex. 3 |
|---|---|---|---|---|
| Master-Batch | SBR (containing 37.5% oil)[1] | 82.5 | 82.5 | 82.5 |
|  | BR | 20 | 20 | 20 |
|  | NR | 20 | 20 | 20 |
|  | Carbon Black[2] | 40 | 30 | 30 |
|  | Silica | 30 | 20 | 20 |
|  | Silica Coupling Agent[3] | 4.8 | 3.2 | 3.2 |
|  | ZnO | 3 | 3 | 3 |
|  | Stearic Acid | 2 | 2 | 2 |
|  | 6PPD (Antiozonant) | 2 | 2 | 2 |
|  | Paraffin Oil | 10 | 10 | 10 |
|  | Wax | 2 | 2 | 2 |
|  | Smoke Dye (Red)[4] | 20 | 20 | 0 |
| Finish | Sulfur | 1.7 | 1.7 | 1.7 |
|  | N-Cyclohexyl-2-Benzothiazolesulfen Amide | 2.0 | 2.0 | 2.0 |
|  | N,N-Diphenylguanidine | 0.5 | 0.5 | 0.5 |
|  | Smoke Dye (Red)[4] | 0 | 0 | 20 |
| Tensile Properties | HD'S | 73 | 72 | 72 |
|  | 300%-Modulus (kg/cm$^2$) | 125 | 128 | 127 |
|  | Tensile Strength (kg/cm$^2$) | 180 | 185 | 182 |
|  | Elongation (%) | 450 | 460 | 454 |

[1]SBR-1721 (41.25 phr) + SBR-1712 (41.25 phr), available from Korea Kumho Petrochemical Co. Ltd. of Jongro-gu, Seoul, Korea.
[2]N-103, available from Korea Carbon Black Co. Ltd. of Bupyong-Gu, Incheon, Korea.
[3]X-50S, available from Degussa Ag. of Düsseldorf, Germany.
[4]Smoke red, available from Keystone Aniline Corp. of Chicago, IL.

EXAMPLES 4-6

Preparation of Sample Generating Yellow Smoke

Figure 3:
FIG. 3 is a color photograph showing yellow smoke generated from another embodiment of the tire of FIG. 1.

Master-batch components were mixed at 160° C. and finish components were mixed at 105° C., either of which included a smoke dye (Smoke yellow), as shown in Table 2 below. Thereafter, the finish mixed compound was extruded, to form various semi-finished products (tread, sidewall, bead, inner liner, belt, carcass, etc.), which were then subjected to a tire building process. Subsequently, the resultant green case for a tire finally underwent a curing process at 180° C. for 15 min, to manufacture a desired tire. When the tire was skidded on a paved road, cloudy yellow smoke was formed (FIG. 3).

TABLE 2

|  |  | Ex. 4 | Ex. 5 | Ex. 6 |
|---|---|---|---|---|
| Master-Batch | SBR | 100 | 100 | 100 |
|  | Carbon Black[1] | 40 | 30 | 30 |
|  | Silica | 30 | 20 | 20 |
|  | Silica Coupling Agent[2] | 4.8 | 3.2 | 3.2 |
|  | ZnO | 3 | 3 | 3 |
|  | Stearic Acid | 2 | 2 | 2 |
|  | 6PPD (Antiozonant) | 2 | 2 | 2 |
|  | Paraffin Oil | 10 | 10 | 10 |
|  | Wax | 2 | 2 | 2 |
|  | Smoke Dye (Yellow)[3] | 20 | 20 | 0 |
| Finish | Sulfur | 1.7 | 1.7 | 1.7 |
|  | N-Cyclohexyl-2-Benzothiazolesulfen Amide | 2.0 | 2.0 | 2.0 |
|  | N,N-Diphenylguanidine | 0.5 | 0.5 | 0.5 |
|  | Smoke Dye (Yellow)[3] | 0 | 0 | 20 |
| Tensile Properties | HD'S | 72 | 71 | 71 |
|  | 300%-Modulus (kg/cm$^2$) | 105 | 110 | 108 |
|  | Tensile Strength (kg/cm$^2$) | 185 | 190 | 186 |
|  | Elongation (%) | 460 | 480 | 470 |

[1]N-103, available from Korea Carbon Black Co. Ltd. of Bupyong-Gu, Incheon, Korea.
[2]X-50S, available from Degussa AG. of Düsseldorf, Germany.
[3]Smoke yellow, available from Keystone Aniline Corp. of Chicago, IL.

EXAMPLE 7-9

Preparation of Sample Generating Blue Smoke

Figure 4:
FIG. 4 is a color photograph showing blue smoke generated from the another embodiment of FIG. 1.

Master-batch components were mixed at 160° C. and finish components were mixed at 105° C., either of which included a smoke dye (Smoke blue), as shown in Table 3 below. Thereafter, the finish mixed compound was extruded, to form various semi-finished products (tread, sidewall, bead, inner liner, belt, carcass, etc.), which were then subjected to a tire building process. Subsequently, the resultant green case for a tire finally underwent a curing process at 180° C. for 15 min, to manufacture a desired tire. When the tire was skidded on a paved road, cloudy blue smoke was formed (FIG. 4).

TABLE 3

|  |  | Ex. 7 | Ex. 8 | Ex. 9 |
|---|---|---|---|---|
| Master-Batch | NR | 100 | 100 | 100 |
|  | Carbon Black[1] | 40 | 30 | 30 |
|  | Silica | 30 | 20 | 20 |
|  | Silica Coupling Agent[2] | 4.8 | 3.2 | 3.2 |
|  | ZnO | 3 | 3 | 3 |
|  | Stearic Acid | 2 | 2 | 2 |
|  | 6PPD (Antiozonant) | 2 | 2 | 2 |
|  | Paraffin Oil | 10 | 10 | 10 |
|  | Wax | 2 | 2 | 2 |
|  | Smoke Dye (Blue)[3] | 20 | 20 | 0 |
| Finish | Sulfur | 1.7 | 1.7 | 1.7 |
|  | N-Cyclohexyl-2-Benzothiazolesulfen Amide | 2.0 | 2.0 | 2.0 |
|  | N,N-Diphenylguanidine | 0.5 | 0.5 | 0.5 |
|  | Smoke Dye (Blue)[3] | 0 | 0 | 20 |
| Tensile Properties | HD'S | 65 | 64 | 64 |
|  | 300%-Modulus (kg/cm$^2$) | 110 | 116 | 114 |
|  | Tensile Strength (kg/cm$^2$) | 225 | 235 | 230 |
|  | Elongation (%) | 405 | 415 | 410 |

[1]N-103, available from Korea Carbon Black Co. Ltd. of Bupyong-Gu, Incheon, Korea.
[2]X-50S, available from Degussa AG. of Düsseldorf, Germany.
[3]Smoke blue, available from Keystone Aniline Corp. of Chicago, IL.

EXAMPLES 10-12

Preparation of Sample Generating Mixed Color Smoke

Master-batch components were mixed at 160° C. and finish components were mixed at 105° C., either of which included smoke dyes (Smoke red, Smoke yellow, Smoke blue), as shown in Table 4 below. Thereafter, the finish mixed compound was extruded, to form various semi-finished products (tread, sidewall, bead, inner liner, belt, carcass, etc.), which were then subjected to a tire building process. Subsequently, the resultant green case for a tire finally underwent a curing process at 180° C. for 15 min, to manufacture a desired tire. When the tire was skidded on a paved road, cloudy smoke having mixed colors of red, yellow, and blue was formed.

TABLE 4

|  |  | Ex. 10 | Ex. 11 | Ex. 12 |
|---|---|---|---|---|
| Master-Batch | NR | 100 | 100 | 100 |
|  | Carbon Black[1] | 40 | 30 | 30 |
|  | Silica | 30 | 20 | 20 |
|  | Silica Coupling Agent[2] | 4.8 | 3.2 | 3.2 |
|  | ZnO | 3 | 3 | 3 |
|  | Stearic Acid | 2 | 2 | 2 |
|  | 6PPD (Antiozonant) | 2 | 2 | 2 |
|  | Paraffin Oil | 10 | 10 | 10 |
|  | Wax | 2 | 2 | 2 |
|  | Smoke Dye (Red)[3] | 10 | 10 | 0 |
|  | Smoke Dye (Yellow)[4] | 5 | 5 | 0 |
|  | Smoke Dye (Blue)[5] | 5 | 5 | 0 |
| Finish | Sulfur | 1.7 | 1.7 | 1.7 |
|  | N-Cyclohexyl-2-Benzothiazolesulfen Amide | 2.0 | 2.0 | 2.0 |
|  | N,N-Diphenylguanidine | 0.5 | 0.5 | 0.5 |
|  | Smoke Dye (Red)[3] | 0 | 0 | 10 |
|  | Smoke Dye (Yellow)[4] |  |  | 5 |
|  | Smoke Dye (Blue)[5] |  |  | 5 |
| Tensile Properties | HD'S | 65 | 65 | 64 |
|  | 300%-Modulus (kg/cm$^2$) | 112 | 115 | 115 |
|  | Tensile Strength (kg/cm$^2$) | 226 | 237 | 232 |
|  | Elongation (%) | 407 | 416 | 412 |

[1]N-103, available from Korea Carbon Black Co. Ltd. of Bupyong-Gu, Incheon, Korea.
[2]X-50S, available from Degussa AG. of Düsseldorf, Germany.
[3]Smoke red, available from Keystone Aniline Corp. of Chicago, IL.
[4]Smoke yellow, available from Keystone Aniline Corp. of Chicago, IL.
[5]Smoke blue, available from Keystone Aniline Corp. of Chicago, IL.

EXAMPLES 13-15

Preparation of Sample Generating Colorful Smoke

Master-batch components were mixed at 160° C. and finish components were mixed at 105° C., either of which included smoke dyes (Smoke red, Smoke yellow, Smoke blue), as shown in Table 5 below. Thereafter, the finish mixed compound was extruded, to form various semi-finished products (tread, sidewall, bead, inner liner, belt, carcass, etc.), which were then subjected to a tire building process. Subsequently, the resultant green case for a tire finally underwent a curing process at 180° C. for 15 min, to manufacture a desired tire. When the tire was skidded on a paved road, cloudy smoke was formed.

TABLE 5

|  |  | Ex. 13 | Ex. 14 | Ex. 15 |
|---|---|---|---|---|
| Master-Batch | SBR[1] | 70 | 70 | 70 |
|  | NR | 30 | 30 | 30 |
|  | Silica[2] | 70 | 70 | 70 |
|  | Silica Coupling Agent[3] | 6 | 6 | 6 |
|  | ZnO | 3 | 3 | 3 |
|  | Stearic Acid | 2 | 2 | 2 |
|  | 6PPD (Antiozonant) | 2 | 2 | 2 |
|  | Paraffin Oil | 20 | 20 | 20 |
| Finish | Sulfur | 1.9 | 1.9 | 1.9 |
|  | N-Cyclohexyl-2-Benzothiazolesulfen Amide | 2.0 | 2.0 | 2.0 |
|  | N,N-Diphenylguanidine | 1.4 | 1.4 | 1.4 |
|  | Smoke Dye (Red)[4] | 20 | 0 | 0 |
|  | Smoke Dye (Yellow)[5] | 0 | 20 | 0 |
|  | Smoke Dye (Blue)[6] | 0 | 0 | 20 |
| Tensile Properties | HD'S | 72 | 73 | 73 |
|  | 300%-Modulus (kg/cm$^2$) | 95 | 96 | 96 |
|  | Tensile Strength (kg/cm$^2$) | 145 | 140 | 140 |
|  | Elongation (%) | 320 | 310 | 310 |

[1]SBR(NS-116 70.0 phr) available from Nippon Zeon Co. Ltd. of Tokyo, Japan.
[2]Silica, available from Rhodia of Cranbury, NJ or Degussa Ag. of Düsseldorf, Germany.
[3]Si-69, available from Degussa Ag. of Düsseldorf, Germany.
[4]Smoke red, available from Keystone Aniline Corp. of Chicago, IL.
[5]Smoke yellow, available from Keystone Aniline Corp. of Chicago, IL.
[6]Smoke blue, available from Keystone Aniline Corp. of Chicago, IL.

As described above, the present invention provides a tread rubber composition for tires, a tire comprising the tread rubber composition, and a method of manufacturing the tread rubber composition. In the present invention, the tread rubber composition can generate smoke having a single color or mixed colors selected from among various colors at a predetermined temperature or higher due to the frictional contact between the tire and the road surface, therefore resulting in smoke giving optimal enjoyment and satisfying requirements of drivers at motor sports events, such as drifting.

While various embodiments are disclosed herein for practicing this invention, it will be apparent to those skilled in the art that various changes and modifications can be made therein without departing from the spirit or scope of the invention.

What is claimed is:

1. Tire for a motor sport vehicle, said tire comprising a rubber tread incorporating therein a heat activated sublimating dye, said tire, upon frictional engagement with a substrate, producing a smoke having a desirable color within the visible spectrum of electromagnetic radiation of wavelengths.

2. Tire as recited in claim 1 wherein said tread comprises from about 0.1-30 wt % of said heat activated sublimating dye.

3. Tire as recited in claim 1 wherein said tread comprises from about 5 to about 10 wt % of said heat activated sublimating dye.

4. Tire as recited in claim 1 wherein said heat activated sublimable dye sublimes into colored smoke at a temperature of about 130° C. or higher.

5. Vehicle tire, said tire comprising a rubber tread incorporating therein a heat activated sublimating dye, said tire, upon frictional engagement with a substrate, producing a smoke having a desirable color within the visible spectrum of electromagnetic radiation of wavelengths.

6. Vehicle tire as recited in claim 5 wherein said tread comprises from about 0.1-30 wt % of said heat activated sublimating dye.

7. Vehicle tire as recited in claim 5 wherein said tread comprises from about 5 to about 10 wt % of said heat activated sublimating dye.

8. Vehicle tire as recited in claim 5 wherein said heat activated sublimable dye sublimes into colored smoke at a temperature of about 130° C. or higher.

9. A tire comprising a tread rubber composition, said tread rubber composition comprising a mixture of rubber and a sublimation dye, said sublimation dye being activated by heat generated by frictional contact with a road surface to generate smoke having various colors at a wavelength of about $39{\sim}76\times10^{-6}$ cm in a frequency range of about $39.5{\sim}77\times10^{13}$ vps.

10. The composition according to claim 9, wherein the sublimation dye is used in an amount of 0.1~30 wt %, based on the total weight of the tread rubber composition.

11. The composition according to claim 9, wherein the sublimation dye is activated at an activation temperature of 130° C. or higher to generate color smoke.

12. The composition according to claim 9, wherein the tread rubber composition has a 300% modulus ranging from 85 to 140 kg/cm$^2$.

13. The composition according to claim 9, wherein said rubber comprises a member selected from the group consisting of polyisoprene rubber, polybutadiene rubber, a conjugated diene aromatic vinyl copolymer, a nitrile conjugated diene copolymer, hydrogenated NBR, hydrogenated SBR, olefin rubber, maleic acid-modified ethylene-propylene rubber, butyl rubber, a copolymer of isobutylene and aromatic vinyl or diene monomer, acryl rubber, an ionomer, halogenated rubber, chloroprene rubber, and mixtures thereof.

14. The tire according to claim 9, wherein the tire is mounted to a truck, automobile car, or motor sports car.

15. A method of manufacturing a tread rubber composition comprising mixing a material for a tread rubber composition comprising rubber and a sublimation dye, said sublimation dye being activated by heat generated by frictional contact with a road surface to generate smoke having colors at a wavelength of between about $39{\sim}76{\times}10^{-6}$ cm in a frequency range of between about $39.5{\sim}77{\times}10^{13}$ vps wherein the sublimation dye is used in an amount from about 5 to about 10 wt % based on the total weight of the tread rubber composition.

16. The method according to claim 15, wherein the sublimation dye is activated at an activation temperature of 130° C. or higher to generate color smoke.

17. The method according to claim 15, wherein the rubber comprises a member selected from the group consisting of polyisoprene rubber, polybutadiene rubber, a conjugated diene aromatic vinyl copolymer, a nitrile conjugated diene copolymer, hydrogenated NBR, hydrogenated SBR, olefin rubber, maleic acid-modified ethylene-propylene rubber, butyl rubber, a copolymer of isobutylene and aromatic vinyl or diene monomer, acryl rubber, an ionomer, halogenated rubber, chloroprene rubber, and mixtures thereof.

* * * * *